United States Patent [19]

Doss

[11] 4,017,467

[45] Apr. 12, 1977

[54] SULFUR-CURABLE COMPOSITIONS

[75] Inventor: Richard C. Doss, Bartlesville, Okla.

[73] Assignee: Phillips Petroleum Company, Bartlesville, Okla.

[22] Filed: Apr. 21, 1975

[21] Appl. No.: 569,908

[52] U.S. Cl. .................. 260/79; 260/31.8 Z; 260/33.8 R; 260/37 R; 260/75 S; 260/79.1; 260/874; 260/897 R

[51] Int. Cl.$^2$ .................. C08F 28/00

[58] Field of Search ........... 260/79, 79.1, 75 S, 260/37 R, 31.8 Z, 33.8 R, 897 R, 874

[56] References Cited

UNITED STATES PATENTS

| | | | |
|---|---|---|---|
| 3,219,638 | 11/1965 | Warner | 260/79 |
| 3,538,063 | 11/1970 | Sorg et al. | 260/79 |
| 3,737,415 | 6/1973 | Kenton | 260/79 |
| 3,798,192 | 3/1974 | Kenton | 260/79 |
| 3,817,936 | 6/1974 | Jones et al. | 260/76 |
| 3,849,381 | 11/1974 | Doss et al. | 260/75 S |

OTHER PUBLICATIONS

Gaylord, Polyethers, Part III, Polyalkylene Sulfides and other Polythioethers Intersciences Publishers N.Y. (1962) p. 165.

*Primary Examiner*—Melvyn I. Marquis

[57] ABSTRACT

Compositions comprising polymercaptan-terminated polymers such as poly(oxyalkylene)-polyester-poly(-monosulfide)-polythiols having an average of more than two mercapto groups per molecule, sulfur as the curing agent, and an alkaline earth metal oxide curing agent accelerator are curable to sealant or coating compositions at ambient temperatures. The poly(oxyalkylene)-polyester-poly(monosulfide)-polythiols comprise the reaction product of (a) a mercaptoalkanoic acid, (b) a thiodialkanoic acid, and (c) a poly(oxyalkylene)polyol.

10 Claims, No Drawings

SULFUR-CURABLE COMPOSITIONS

This invention relates to polymercaptan-terminated polymers curable to sealant and coating compositions at ambient temperatures. In accordance with another aspect, this invention relates to poly(oxyalkylene)-polyester-poly(monosulfide)-polythiol polymers that are sulfur-curable at ambient temperatures in the presence of a curing agent accelerator. In accordance with another aspect, this invention relates to compositions comprising a poly(oxyalkylene)-polyester-poly(-monosulfide)-polythiol polymer, sulfur, and an alkaline earth metal oxide curing agent accelerator that are curable to sealant or coating compositions at ambient temperatures. In accordance with a further aspect, this invention relates to polymercaptan-terminated polymers, sulfur, and at least one alkaline earth metal oxide curing agent accelerator in combination with conventionally used nonelastomeric components of sealant and coating formulations that are curable at ambient temperatures.

It is known that radicals and molecules having thiol functionality can be bonded to similar groups and other molecules, usually by oxidative coupling or curing. Because of this characteristic, polythiols have found application as sealants, coatings, caulking compounds, and bonding compositions. It is also known that numerous polythiols are expensive, inconvenient, and, as a result, undesirable in such applications. Also, many of the prior art compositions require heat to effect cure. The present invention provides compositions that are curable at ambient conditions to products useful as sealants, coatings, etc.

In caulking and sealant formulations, especially around windows and other outdoor applications, it is important that a proper and rapid cure take place. Therefore, if a simple heat curable formulation can be converted to an ambient temperature curable formulation by the addition of a suitable accelerator, this is an economically attractive advance in the art.

Accordingly, it is an object of this invention to provide sealants, coatings, and caulking compositions based on polymercaptan-terminated polymers curable at ambient temperatures.

Another object is to provide more readily curable sealant and coating formulations.

Another object of this invention is to provide sealants and coatings with a desirable balance of physical properties.

Other objects, aspects, and the several advantages of this invention will be apparent to those skilled in the art upon a study of this disclosure and the appended claims.

In accordance with the invention, sealant and coating compositions having a desirable balance of physical properties are prepared by curing at ambient temperatures a mixture comprising a polymercaptan-terminated polymer, sulfur, and at least one sulfur curing agent accelerator selected from alkaline earth metal oxides and the balance optionally being nonelastomeric components including fillers, plasticizers, antioxidants, adhesion promoters, and the like.

In accordance with a specific embodiment of this invention, the polymercaptan-terminated polymers that can be used comprise a poly(oxyalkylene)-polyester-poly(monosulfide)-polythiol polymer having an average of more than two mercapto groups per molecule which are prepared by the reaction of a poly(oxyalkylene)polyol with a mercaptoalkanoic acid and a thiodialkanoic acid. The resulting product is combined with sulfur and at least one sulfur curing agent accelerator, as defined herein, and then the resulting mixture is allowed to cure at ambient temperatures to produce sealant and coating compositions having a desirable balance of physical properties.

In accordance with another embodiment of the invention, a poly(oxyalkylene)-polyester-poly(monosulfide)-polythiol polymer having an average of more than two mercapto groups per molecule is cured at ambient temperatures with sulfur and at least one alkaline earth metal oxide preferably in a sealant or coating formulation to produce a composition useful as a sealant or coating.

It has been found that the addition of Group IIa alkaline earth metal oxides (Mg, Ca, Sr, Ba) to caulking and sealant formulations containing sulfur as a curing agent will permit ambient temperature curing. The alkaline earth oxides without the sulfur are also ineffective as curing agents at ambient temperatures.

The accelerator/promoters are selected from oxides of Group IIa elements of the Periodic Classification of the Elements and include magnesium oxide, calcium oxide, strontium oxide, and barium oxide with MgO and CaO preferred.

Sulfur is the sole curing agent of these particular formulations.

The invention therefore resides in the combination of sulfur and alkaline earth oxide in approximately equimolar concentrations in caulking and sealing compositions of poly(oxyalkylene)-polyester-poly(monosulfide)-polythiol polymers curable at ambient temperatures. Both compositions and methods are included in the scope of the invention.

The poly(oxyalkylene)-polyester-poly(monosulfide)-polythiols having an average of more than two mercaptan groups per molecule can be produced by reacting at least one mercaptodialkanoic acid and at least one thiodialkanoic acid with poly(oxyalkylene)-polyols having an average of more than two hydroxy groups per molecule. The mercaptoalkanoic acids, the thiodialkanoic acids, and the poly(oxyalkylene)-polyols that can be used to prepare the poly(oxyalkylene)-polyester-poly(monosulfide)-polythiol polymers are described in detail in U.S. Pat. No. 3,849,381, Doss et al., issued Nov. 19, 1974. In addition, said patent sets forth the ratios of reactants, reaction conditions, and the like.

Although the amounts of sulfur curing agent and alkaline earth metal oxide curing agent accelerator can vary over a considerable range, the sulfur should be added in an amount at least sufficient to achieve conversion of at least about 70 percent of the mercapto groups present. Normally, about 0.01 to 5, preferably about 0.1 to about 3, parts by weight sulfur should be used per 100 parts by weight poly(oxyalkylene)-polyester-poly(monosulfide)-polythiol polymer. The amount of alkaline earth metal oxide curing agent accelerator present will also be normally in the range of about 0.01 to about 5, preferably about 0.1 to about 3, parts by weight accelerator per 100 parts by weight of the poly-(oxyalkylene)-polyester-poly(monosulfide)-polythiol polymer. Approximately equimolar quantities by weight of sulfur curing agent and curing agent accelerator are preferred.

Materials that can be employed together with the poly(oxyalkylene)-polyester-poly(monosulfide)-polythiol and the sulfur curing agent and alkaline earth metal oxide curing agent accelerator in sealant and coating formulations include any material conventionally used as a nonelastomeric component of sealant and coating formulations, e.g., fillers, plasticizers modifiers, pigments, extenders, stabilizers, adhesion promoters, and the like, such as calcium carbonate, titanium dioxide, silica, iron oxide, carbon black, dibutyl phthalate, chlorinated hydrocarbons, sulfur, alumina, zirconia, polyethylene, polystyrene, partially hydrolyzed gamma-glycidoxypropyltrimethoxysilane, 2,2'-methylenebis(4-methyl-6-tert-butylphenol), water, and the like.

The amount of poly(oxyalkylene)-polyester-poly(monosulfide)-polythiol present in the sealant or coating formulations containing nonelastomeric components will vary appreciably depending upon the desired final characteristics of the sealant or coating composition.

A typical caulking composition will contain fillers, plasticizers, curing agents, and accelerators, optionally some stabilizer, antioxidants, UV absorbers, and colorants. A nonlimiting example is shown below:

| Ingredient | Approximate Wt. % |
|---|---|
| PM Polymer | 45–55 |
| Plasticizer | 5–10 |
| Sulfur[1] | 0.01–0.1 |
| Accelerator[2] | 0.01–0.1 |
| Silica | 2–5 |
| $TiO_2$ | 5–10 |
| Antioxidant | 0.5 |
| Calcium carbonate | 25–35 |
| Carbon black | 0.05–0.1 |
| Water | 1 |

[1]Amount calculated on the basis of active sites in polymer. Stoichiometric amount + about 30% by weight excess.
[2]Approximately equimolar amounts S and accelerator.

The poly(oxyalkylene)-polyester-poly(monosulfide)-polythiol, the sulfur curing agent, the alkaline earth metal oxide curing agent accelerator, and any other nonelastomeric component employed in the sealant or coating formulations can be blended together simultaneously and suitably agitated, e.g., by hand mixing or machine blending, or the sulfur curing agent and the alkaline earth metal oxide accelerator with or without other nonelastomeric components can be added to the poly(oxyalkylene)-polyester-poly(monosulfide)-polythiol previously blended with other components normally used in sealant or coating formulations. The particular technique for blending the ingredients will depend in part upon available equipment and the requirements of the sealant or coating application problem.

The sealants and coating of this invention can be employed to join or coat various substrates. For example, substrates, such as wood, plastics, glass, stone such as granite, marble, or the like, concrete or metal such as aluminum, steel, iron, zinc, or the like, can be joined or coated.

EXAMPLE I 20 g samples of polyethermercaptopropionate [a PM polymer which is a poly(oxyalkylene)-polyester-poly(monosulfide)-polythiol having an average of more than two pendent thiol groups per molecule, prepared as in U.S. Pat. No. 3,817,936, Jones et al., issued June 18, 1974] were formulated with sulfur alone and accelerators at a level calculated as stoichiometric plus 30 percent by weight excess based on active sites in the uncured polymer:

TABLE I

| Curing Agent per 20 g polymer | Accelerator | Status after 3 Days at 25° C (77° F) |
|---|---|---|
| Sulfur (0.21 g) (CONTROL) | none | no cure - tacky & fluid |
| MgO (0.26 g) (CONTROL) | none | no cure - tacky & fluid |
| Sulfur (0.21 g) | MgO (0.26 g) | cured - no flow - not tacky |
| Sulfur (0.21 g) | CaO (0.40 g) | cured - no flow - slightly tacky |
| Sulfur (0.21 g) | ZnO (0.54 g) | no cure (cured at 70° C) |

The data show that sulfur, MgO, and sulfur and ZnO in these formulations will not effect a cure of the PM polymers at ambient temperatures while the combinations of sulfur with one of MgO or CaO according to the invention are curable.

EXAMPLE II

Sealant formulations were prepared as follows:

| Formulation No. | 1 | 2 |
|---|---|---|
| PM Polymer[2] | 20 g | 20 g |
| Chlorinated paraffin[1] | 3 g | 3 g |
| $TiO_2$ | 2 g | 2 g |
| $CaCO_3$ | 10 g | 10 g |
| $SiO_2$ | 1.2 g | 1.2 g |
| Sulfur | 0.21 g | 0.21 g |
| Accelerator (MgO) | — | 0.26 g |

[1]Clorafin 50 (50% chlorine) Hercules, Inc.
[2]A poly(oxyalkylene)-polyester-poly(monosulfide)-polythiol having an average of more than two pendent thiol groups per molecule.

Properties of Cured Sealant Composition

| | FORMULATION NO.: | |
|---|---|---|
| | 1 | 2 |
| 50% Modulus | 13[2]   13[2] | 17[3] |
| Tensile Break, psi | 29   30 | 31 |
| % Elongation | 238   213 | 250 |

[2]Cured 1 day at 25° C, 2 days at 70° C.
[3]Cured 3 days at 25° C; Formulation 1 with sulfur aone did not cure at 25° C.

The data illustrate that using an accelerated cure of 1 day at 25° C and 2 days at 70° C the sulfur by itself and the sulfur-MgO combination are nearly equivalent but that for ambient temperature cure the composition containing the MgO accelerator is required.

I claim:
1. A polythiol composition which is curable at ambient temperatures comprising, in weight ratio:
   a. 100 parts by weight of a poly(oxyalkylene)-polyester-poly(monosulfide)-polythiol having on average more than two pendent thiol groups per molecule,
   b. from about 0.01 to 5 weight parts of sulfur as the curing agent, and
   c. from about 0.01 to about 5 weight parts of at least one of magnesium oxide and calcium oxide curing agent accelerator, the amounts of (b) and (c) present being sufficient to effect cure of said polythiol at ambient temperatures and at 3 days.
2. A composition according to claim 1 wherein the amounts of (b) and (c) are in the range of about 0.1 to about 3 weight parts per 100 weight parts of (a).

3. A composition according to claim 1 wherein there are approximately equimolar amounts of (b) and (c) present in said composition.

4. A composition according to claim 1 wherein (c) is magnesium oxide or calcium oxide.

5. A composition according to claim 1 wherein (a) is the reaction product of 3-mercaptopropionic acid, 3,3'-thiodipropionic acid, and a poly(oxyalkylene)-polyol formed by reacting 1,2,6-hexanetriol and propylene oxide.

6. A composition according to claim 1 useful as a sealant and caulking composition further comprising nonelastomeric components selected from fillers, plasticizers, antioxidants, and adhesion promoters.

7. A process for curing liquid polythiol at ambient temperatures which comprises:
 a. admixing 100 weight parts of a poly(oxyalkylene)-polyester-poly(monosulfide)-polythiol having on average more than two pendent thiol groups per molecule with from about 0.01 to 5 weight parts of sulfur curing agent and from about 0.01 to about 5 weight parts of at least one of magnesium oxide and calcium oxide curing agent accelerator and
 b. subjecting the mixture of step (a) to ambient temperatures for a period of time of 3 days to effect cure of said polythiol.

8. A process according to claim 7 which further comprises the step of adding to said admixture at least one nonelastomeric component selected from fillers, plasticizers, antioxidants, and adhesion promoters.

9. A process according to claim 7 wherein the amounts of sulfur and magnesium calcium oxides incorporated into said polythiol ranges from about 0.1 to about 3 weight parts each per 100 weight parts of polythiol.

10. A process according to claim 7 wherein about equimolar amounts of sulfur and alkaline earth metal oxide are incorporated into said polythiol.

* * * * *